Figure 1:
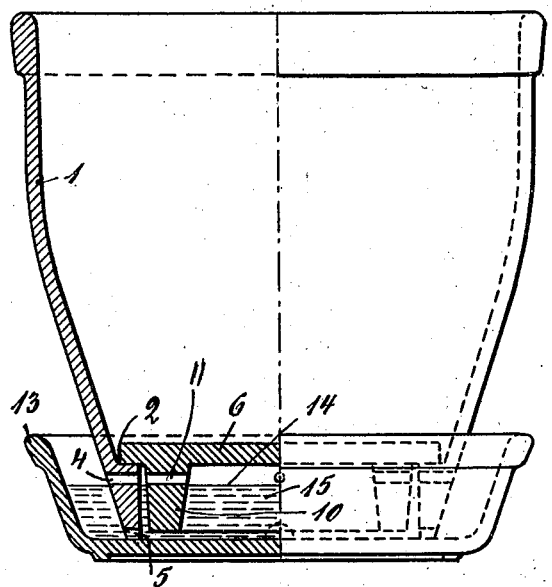

Sept. 13, 1938. G. HAGLUND 2,130,234
FLOWERPOT
Filed Feb. 27, 1937

INVENTOR:
GUSTAF HAGLUND

BY: Francis E. Boyce
ATTORNEY

Patented Sept. 13, 1938

2,130,234

UNITED STATES PATENT OFFICE 2,130,234

FLOWERPOT

Gustaf Haglund, Storangen, at Stockholm, Sweden

Application February 27, 1937, Serial No. 128,055
In Sweden March 5, 1936

1 Claim. (Cl. 47—38)

The present invention relates to improvements in flower vessels or flower-pots.

In the cultivation of pot plants in flower-pots of the type commonly used it is very difficult to regulate the watering in such a way that a proper quantity of water is supplied to the plant or, in other words, that a suitable content of moisture is constantly maintained in the earth in the pot. This is the case whether the watering is carried out by pouring water from above on to the earth in the pot or water is supplied to a pan or saucer in which the pot is placed and from which the water is to be sucked up through the bottom of the pot and absorbed by the plant itself. In both cases it may easily occur that the water if supplied in excess may remain standing in the saucer for a long time, so that the supply of air through the bottom of the pot is cut off.

When using glazed pots said disadvantages are still more pronounced. If in such cases the quantity of water supplied is too great it may easily occur that the root system of the plant may be standing in a layer of earth which is completely water-soaked. At the same time it is justified to speak of suffocation of the roots, as the admission of air to the lower part of the pot and the root system is completely cut off, and on account of the glazing no supply of air through the side walls of the pot is possible. To these circumstances may be attributed the fact that plants generally do not seem to thrive particularly well in glazed pots.

Still more complicated are the conditions in rooms with central heating. In such rooms the air is considerably drier than in rooms heated by stoves, and further the radiators are generally disposed under the window-sills on which the flower-pots are generally placed. When using flower-pots of the common type without any isolating layer between the pot and the window-sill—often consisting of a marble plate—the root system of the plant is often exposed to an abnormal heating.

In order to reduce said disadvantages it has been proposed to arrange a special water chamber under the bottom surface of the pot serving as a support for the earth in the pot, for instance by arranging a false bottom in the pot at a suitable distance from the bottom proper, and to convey water from the water chamber (reservoir) thus formed to the interior of the pot by means of the capillarity of porous bodies, extending down into this chamber. But also this type of pot suffers, more or less, from the above-mentioned disadvantages, especially as the supply of water to said chamber is as a rule carried out by pouring water from above on to the earth in the pot from where it has to seep down into the chamber. It is, therefore, also here difficult or in many cases impossible to effect a regulation and control of the supply of water to the chamber or the plant.

The present invention relates to flower-pots of above-mentioned kind, in which the water chamber (reservoir) is formed under a bottom arranged at some distance from the lower edge of the side walls, between said bottom, the side walls and a pan, saucer or the like in which the pot is intended to be placed and to which the water for the plant is to be supplied.

The object of the invention is to provide an arrangement enabling at the same time a satisfactory regulation of the supply of water to the chamber (including the possibility of observing without difficulty the level of water in the chamber) and an effective ventilation under the bottom of the pot supporting the earth above the surface of water in said water chamber.

According to the invention this is attained by arranging in the side walls of said water chamber (reservoir) holes or openings at different heights, the lower of said openings being intended to serve for equalization of the level of water in the pan or saucer, so as to obtain the same water level inside and outside the side walls of the pot, while the upper ones are intended to enable the ventilation of air under the bottom of the pot above the water level. Said holes or openings which may be arranged parallel with or obliquely to the horizontal plane are obviously arranged in the number required for attaining the purpose aimed at.

By means of the arrangement according to the invention the regulation and control of the supply of water to the pot or plant may be easily effected. The level of water in the saucer always being visible, there is no difficulty to estimate the suitable quantity of water which should be supplied to the saucer. Said upper openings in the side walls of the pot serve as marks to indicate the highest level of water which is allowed in the saucer when supplying water to the same, and at the same time these openings serve for the ventilation of air under the bottom of the pot above the water level in the saucer. Consequently, in view of the foregoing, there is no risk of supplying so much water, that it will rise to the bottom of the pot and soak the lowermost layer of the earth in the pot or cut off the supply of air. Moreover, it is possible at a single glance to ascertain whether there is still water in the saucer or whether the water should be replenished.

The flower-pot including the capillary members serving as water conduits may according to the invention in other respects be arranged and shaped in any suitable manner. Thus the bottom may be either fixed or loose, and the capillary members, for instance bodies in the form of rods, taps or the like, preferably made of porous earthenware may be either permanently fixed in or on the bottom or side walls, or even manufactured in one piece with these, or also loosely inserted into holes or channels therein. Said members may also be arranged as ribs on the inner surface of the side walls or, simply, consist of one or more, preferably annular, flanges on the under side of the bottom. Instead of earthenware also charcoal or other suitable porous material having sufficient capillary action may be used. Further the capillary bodies as known per se may consist of wicks of a suitable material, for instance wick-cotton, inserted into holes or channels in the bottom or the side walls of the water chamber or in channels in said rod- or rib-formed bodies, which in this case need not necessarily be of porous material.

Figure 2:
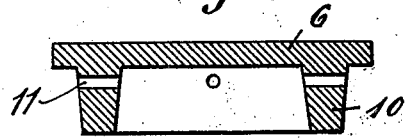
Figure 3:
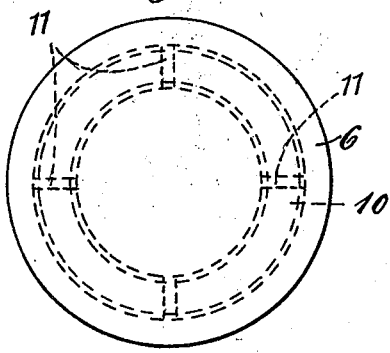

The invention is hereinafter described with reference to the accompanying drawing in which Fig. 1 is a partly sectional side view of a flower pot embodying the features of the present invention;

Fig. 2 is a transverse sectional view of the loose or separate bottom of the flower pot shown in Fig. 1; and Fig. 3 is a plan view of said bottom.

In the drawing 1 designates the side walls of the flower-pot which may be glazed on the outer surface. As shown in Fig. 1, the wall of the flower pot at some distance from its lower edge is provided with a shoulder 2 which serves as a support for a separately formed bottom 6. In the pot shown openings are arranged in the side walls at different heights, namely vent openings 4 at some distance from the lower edge of the walls and openings 5 at said lower edge for the equalization of the water level in the saucer 13 in which the pot is placed.

The loose or separate bottom 6, which is preferably of porous material, is provided with an annular flange 10 depending from its under surface, said flange having transverse perforations 11 at such a height that when the bottom is in position in the pot, that is, seated on the shoulder 2, the said perforations 11 will register with the vent openings 4 in the wall of the flower pot. The flange 10 and its perforations thus constitute a conduit for the circulation of moisture and air between the saucer 13 and the space below the bottom 6, thereby equalizing the water level.

An especially simple and practical embodiment is shown in Figs. 1 to 3 where the water conduit member consists of an annular flange 10 arranged on the under surface of the bottom plate 6b. In said flange 10 holes are arranged at a height corresponding to the openings 4 in the side walls when the bottom is placed on the shoulder 2.

The pot according to the invention functions in the following manner.

When the watering is to be carried out the water is poured into the saucer which may be assumed to be of such a height that the edge of the saucer extends some distance above the openings 4. In this operation care is to be taken that the level 14 of the water does not reach the openings 4.

In this way a free ventilation of air can take place through the vent holes 4 and the air space 15 between the water level in the saucer and the bottom 6, whence the supply of air through the bottom of the pot can proceed without hindrance. Said air space also serves as a good insulator which prevents over-heating of the lower part of the pot or the root system of the plant when the pot is placed on a heated support. The cooling caused by the evaporation of water passing upwards through the porous bodies and promoted by said air ventilation also contributes to this result.

If desired, said air ventilation through the bottom of the pot and the earth contained therein may be further increased by providing the bottom with suitable perforations. A considerable advantage connected with the use of a loose bottom as herein shown, resides in the fact that transplanting of the plant may be easily effected. For this purpose, it is only necessary to place the pot on a suitably sized wooden block or the like and press the pot downwards, whereby the block will push the bottom with the lump of earth and the plant upwards.

As mentioned above the invention may be applied in connection with glazed or unglazed pots, the advantages of the free air ventilation being especially pronounced in the former case. Further instead of earthenware any other suitable material may be used for the pot. Finally the pot may have any desired form or cross-section, for instance round, square, etc.

It should be mentioned that the application of the invention in practice has given excellent results.

Obviously, the invention is not limited to the embodiment shown above by way of example but all such alterations and modifications are made which may be within the scope of the invention.

Having now particularly described the nature of my invention and the manner of its operation what I claim is:

The combination of a flower-pot having an internal shoulder arranged at some distance from the lower edge of the side walls of the pot, a loose bottom of porous material adapted to rest on said shoulder and to support the earth in the pot, and a saucer adapted to receive said flower-pot, the space between said bottom when put in place, the side walls of the pot and the bottom of the saucer being adapted to serve as a water chamber or reservoir for the plant to be cultivated in the pot, said loose bottom being on its under side provided with an annular flange extending downwards into the lower part of said space and adapted to conduct water by capillary action from said chamber to the earth supported by said bottom, said side walls of the water chamber being provided, at their lower edge, with a set of openings adapted to serve for equalization of the level of water in said saucer inside and outside said side walls and, at some distance from said lower edge, with a set of openings adapted to serve as vents for ventilation of air under the earth-supporting bottom above the water level in said water chamber.

GUSTAF HAGLUND.